H. JOHNSON.
CHURN.
APPLICATION FILED OCT. 7, 1908.
912,852.
Patented Feb. 16, 1909.
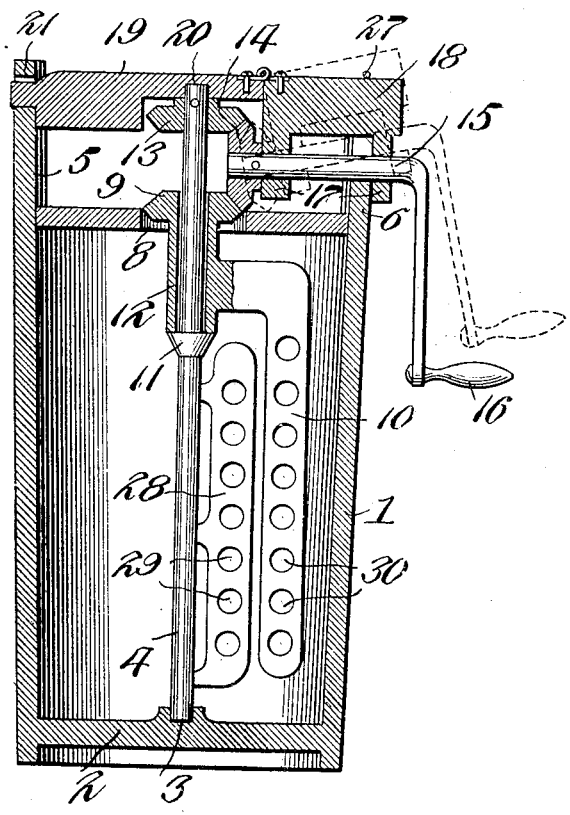
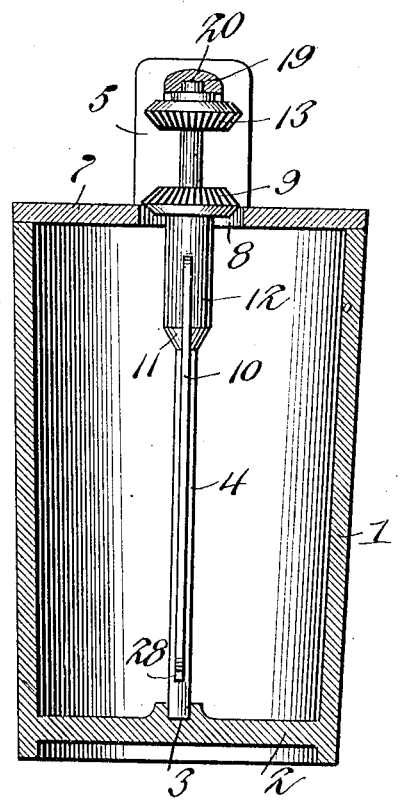
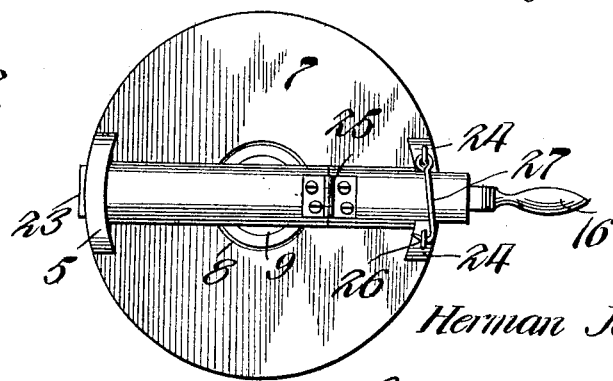
Witnesses
Hugh H. Ott.
Wm. Roerth
Inventor
Herman Johnson
By Victor J. Evans
Attorney

UNITED STATES PATENT OFFICE.

HERMAN JOHNSON, OF NORWAY, MICHIGAN, ASSIGNOR OF ONE-THIRD TO JACOB OHLSON, OF NORWAY, MICHIGAN.

CHURN.

No. 912,852.  Specification of Letters Patent.  Patented Feb. 16, 1909.

Application filed October 7, 1908. Serial No. 456,558.

*To all whom it may concern:*

Be it known that I, HERMAN JOHNSON, a citizen of the United States, residing at Norway, in the county of Dickinson and State of Michigan, have invented new and useful Improvements in Churns, of which the following is a specification.

This invention relates to churns, and the object of the invention is to provide an extremely simple and effective device of this character having dashers revolving in different directions whereby globules of the milk or cream are quickly broken and separated and the butter quickly churned.

Another object of the invention is to provide a novel securing device for the dasher, whereby the dashers and their operating mechanism may be quickly and easily removed from the churn.

With these and other objects in view the invention resides in the novel construction and arrangement of parts hereinafter fully described and claimed.

In the accompanying drawing, Figure 1 is a central longitudinal sectional view through the churn. Fig. 2 is a similar view taken at right angles to Fig. 1. Fig. 3 is a top plan view.

In the accompanying drawing the numeral 1 designates an ordinary churn. This churn 1 has its base or bottom portion 2 provided with a centrally arranged socket 3 adapted for the reception of a dasher stem 4. The body of the churn 1 may be inclined as indicated in the figures of the drawing and is provided with oppositely disposed upwardly extending portions 5 and 6. The churn is also provided with a suitable cover 7 having oppositely disposed cut away portions adapted to engage the extensions 5 and 6, and the cover 7 is also provided with a centrally arranged annular cut away portion 8, whereby the dasher stem 4 and a beveled wheel 9 carried by a second dasher 10, supported upon the dasher stem 4 may be projected above the surface of the top 7. The dasher stem 4 is provided with a suitable offset or flange 11 which is adapted to act as a support for the hollow stem 12 provided for the offset dasher blade 10. The upper portion of the dasher stem 4 is provided with a beveled wheel 13 which has its inclined face positioned a suitable distance above the inclined face of the beveled wheel 9 so as to provide a suitable space between these beveled toothed wheels 9 and 13 adapted for the reception of an intermediate toothed wheel 14 carried upon a shaft 15 which is provided with an offset handle 16. The shaft 15 is rotatably mounted in downwardly extending fingers 17 carried by the hinged end 18 of a top bar 19. This bar 19 is provided with a socket 20 adapted for the reception of the upper extending portion of the dasher stem 4. The extending portion 5 of the churn 1 is provided with a cut away portion 21 adjacent its end and this recess or cut away portion is adapted for a reduced tongue 23 carried by the top bar 19. The oppositely extending portion 6 of the churn 1 is suitably bifurcated so as to provide a space between the upstanding arms 24, provided by the bifurcation, and adapted for the reception of the hinged portion 18 of the top bar 19. As clearly illustrated in Figs. 1 and 3 of the drawings this portion 18 is connected with the portion 19 through the medium of the hinge 25 and one of the upstanding arms 24 of the projection 6 is provided with an eye 26 adapted for the reception of a swinging hook 27 carried by the opposite arm 24.

The dasher stem 4 is provided with an outwardly projecting dasher 28, and this dasher comprises a vertical member or bar having a plurality of spaced perforations or openings 29. The dasher 10 provided upon the collar 12 is suitably offset so as to clear the path of the dasher 28 as these members are rotated, and the dasher 10 is also provided with a plurality of spaced perforations or openings 30, similar to the openings 29 provided in the dasher 28.

By arranging and constructing the parts as above described it will be readily noted, that upon rotation of the axle 15 through the medium of the handle 16 the dashers 10 and 28 are caused to revolve in opposite directions, thus thoroughly agitating the milk or cream within the churn 1 and quickly and easily separating the globules of the cream thereby reducing the same to butter. It will be also noted that by the arrangement of the top bars 18 and 19 the bars may be quickly separated from the churn by merely unhooking the catch 27 and raising the hinge member 18, as indicated by the dotted lines in Fig. 1, thereby separating the bevel 14 carried by the shaft 15 from the bevels 9 and 13 and allowing for the ready withdrawal of the reduced portion 23 through the opening 21. The dashers and top 7 may be then readily withdrawn from the churn 1.

While I have described my improved device in connection with a churn, it is to be understood that the same may be successfully employed in mixing paints, medicines or the like, and that while I have illustrated and described the preferred embodiment of my invention minor details of construction, within the scope of the following claims may be resorted to without departing from the spirit or sacrificing any of the advantages of the device.

Having thus fully described the invention what is claimed as new is:

1. In a churn, a dasher stem having a collar and being provided with a beveled wheel, a dasher upon the stem, said dasher provided with vertically extending offset members having a series of spaced openings, a second dasher having an offset collar provided with a beveled wheel rotatably mounted upon the first dasher stem and having its collar supported by the collar of the stem, the second dasher comprising a vertically disposed member having a plurality of openings and positioned out of the path of the first dasher, a handle provided with a bevel wheel adapted to engage the bevels provided by the two dashers, and a pivoted bearing for the handle whereby the bevel wheel carried by the handle may be swung into or out of engagement with the bevels of the dashers.

2. In a device of the character described, a churn having oppositely disposed upstanding portions, one of said portions being provided with a recess, the opposite portion being bifurcated for a suitable distance, the bottom of the churn being provided with a socket, a top having a central opening and having its edges provided with diametrically opposite cut away portions adapted to engage the projections of the churn, a dasher stem for the socket and projecting above the top of the churn, a dasher upon the stem, said dasher comprising a vertically disposed offset member provided with a plurality of openings, an annular offset upon the stem, a beveled wheel upon the stem, a collar provided with a beveled wheel mounted upon the stem between the offset and the bevel carried by the stem, said collar being provided with an offset portion having a downwardly extending dasher member arranged beyond the outer edge of the dasher carried by the stem, the second dasher member being provided with a plurality of openings, a removable top bar having an extending portion adapted to engage with the recess of one of the projections of the churn and having a socket adapted to engage the upper portion of the stem, the top bar being provided with a hinged extension having downwardly extending arms provided with openings, an operating shaft within these openings, a bevel upon the shaft adapted to mesh with the bevel of the stem and the bevel of the collar, and means for securing the hinged member of the top bar between the arms provided by the bifurcated extending portion of the churn.

In testimony whereof I affix my signature in presence of two witnesses.

HERMAN JOHNSON.

Witnesses:
J. B. ERICKSON,
ANDREW OHLSON.